United States Patent [19]
Cohl

[11] 3,745,653
[45] July 17, 1973

[54] METHOD OF ORTHODONTIA
[76] Inventor: Matthew E. Cohl, 323 Evans St., Apt. G., Williamsville, N.Y. 14221
[22] Filed: Dec. 6, 1971
[21] Appl. No.: 205,020

[52] U.S. Cl. ................................. 32/14 A
[51] Int. Cl. ............................... A61c 7/00
[58] Field of Search ............................ 32/14 A, 17

[56] References Cited
UNITED STATES PATENTS

| | | | |
|---|---|---|---|
| 3,345,745 | 10/1967 | Muller | 32/14 A |
| 3,250,002 | 5/1966 | Collito | 32/14 A |
| 3,638,312 | 2/1972 | Szwarc | 32/15 |
| 3,250,003 | 5/1966 | Collito | 32/14 A |

Primary Examiner—Robert Peshock
Attorney—Sommer, Webber & Gastel

[57] ABSTRACT

A method of attaching a bracket to a tooth comprising the steps of providing a bracket through which ultraviolet light can be transmitted, applying an adhesive which hardens when exposed to ultraviolet light to an area where said bracket is to be secured to said tooth, placing said bracket on said tooth, and exposing said adhesive to ultraviolet light by directing ultraviolet light through said bracket to harden said adhesive and thereby bond the bracket to said tooth. An orthodontic bracket installation comprising a transparent bracket secured to a tooth with transparent cement.

6 Claims, 3 Drawing Figures

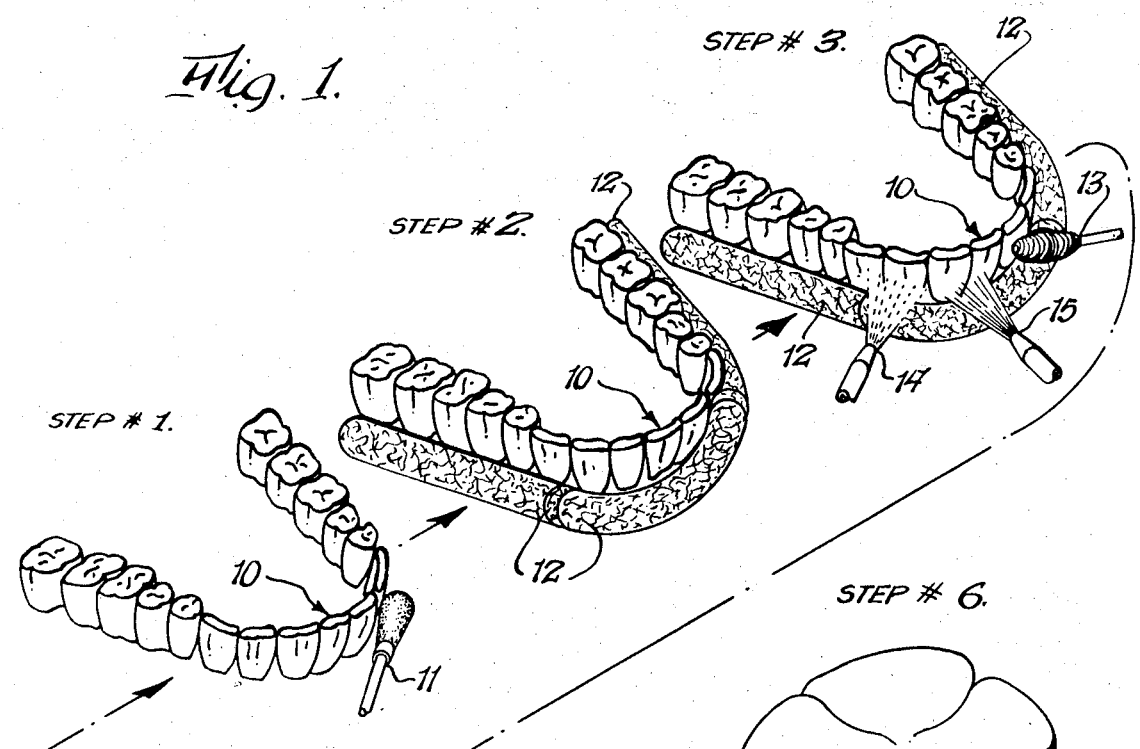
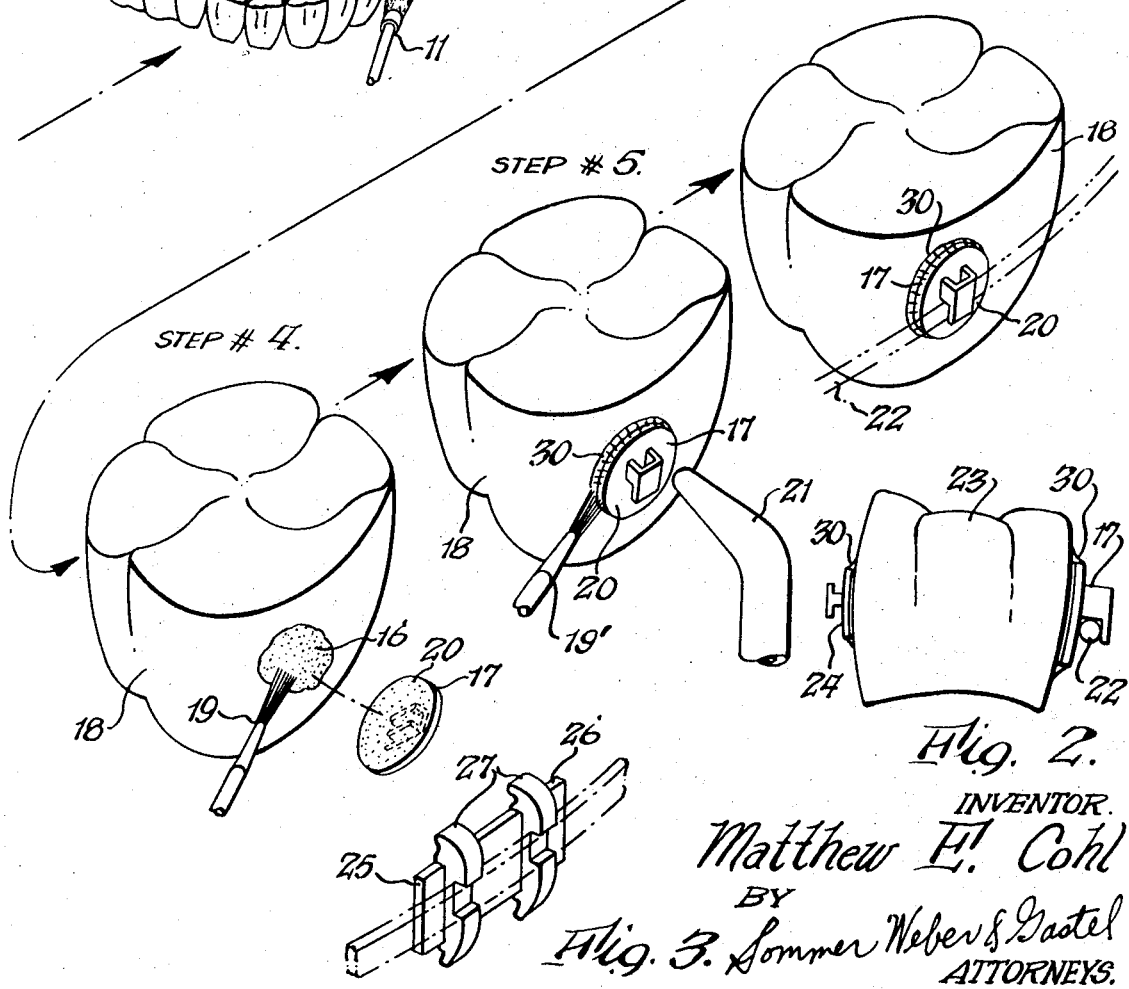

METHOD OF ORTHODONTIA

The present invention relates to the field of orthodontia and more particularly to an improved method of attaching brackets to teeth and to an improved bracket installation.

In the past there have been various ways of attaching brackets to teeth including cementing the brackets to the surfaces of the teeth. However, this method had certain shortcomings. In this respect, if the cement took too long to set, this constituted a great annoyance and inconvenience to the orthodontist because he had to hold the bracket in position for an undesirably long time. If the cement set too quickly, many times he could not place the bracket in proper position before setting occurred. In addition, the various cements had an objectionable color, which necessitated trimming the excess cement from the portion of the tooth adjacent the edges of the bracket to avoid an unsightly appearance. In addition orthodontic installations were generally unsightly in the sense that they contrasted sharply in color with the teeth. It is with overcoming the foregoing deficiencies of prior methods of installing orthodontic brackets that the present invention is concerned.

It is accordingly one important object of the present invention to provide an improved method of attaching a bracket to a tooth which is extremely simple and efficient in that the cement can be caused to harden in an extremely short time only after the bracket has been properly positioned. A related object of the present invention is to provide an improved method of attaching a bracket to a tooth which utilizes cement which can be hardened by exposing it to ultraviolet light through a bracket through which ultraviolet light can be transmitted.

Another object of the present invention is to provide an improved method of attaching a bracket to a tooth and an orthodontic installation which uses both a colorless cement and a transparent bracket so that the existence of the bracket on the tooth is barely discernible, thereby making the installation more aesthetically pleasing than those installations which use brackets which contrast with the teeth.

A further object of the present invention is to provide an improved method of attaching a bracket to a tooth by cement which does not require trimming of the cement, thereby facilitating the installation procedure. Other objects and attendant advantages of the present invention will readily be perceived hereafter.

The improved method of the present invention comprises the steps of providing a bracket through which ultraviolet light can be transmitted, applying a cement which hardens when exposed to ultraviolet light to an area where said bracket is to be secured to a tooth, placing said bracket in position on said tooth and exposing said cement to said ultraviolet light through said bracket to thereby bond said bracket to said tooth. The improved orthodontic bracket installation of the present invention comprises a transparent bracket secured to a tooth by transparent cement.

The various aspects of the present invention will be more fully understood when the following portions of the specification are read in conjunction with the accompanying drawings wherein:

FIG. 1 is a flow diagram illustrating the steps which are performed in the improved method of the present invention;

FIG. 2 is a side elevational view of a tooth having brackets on both the facial and lingual surfaces of the tooth; and FIG. 3 is a perspective view of another type of bracket which can be used in practicing the present invention.

In practicing the improved method of the present invention, the teeth 10 are cleaned by the use of suitable pumice and a rotary cleaning tool 11, as shown in step 1. Thereafter, in step 2 the teeth are isolated in the oral cavity by the use of cotton rolls 12 or a rubber dam technique, as is well known. Then, in step 3 the teeth are further conditioned by applying a commercially available solution for the required time. In this particular case the solution which is applied, as with a swab 13, consists of 50% phosphoric acid with 7 percent zinc oxide. The conditioning solution remains on the teeth for one and one half minutes and thereafter the teeth are washed with water by means of jet 14 and then air dried by means of an air jet 15. Any other suitable conditioning solution may be used.

The fourth step consists of applying a pit and fissure sealant 16 to the area at which the bracket 17 is to be applied to each of the teeth, on a tooth-by-tooth basis. This sealant is preferably painted onto tooth 18 by means of brush 19 and is also painted on the surface of base 20 of the bracket which is secured to the tooth. Alternatively, the sealant can be applied either to the tooth or to the bracket. Bracket 17 is molded from water clear plastic which will transmit ultraviolet light. A bracket which has been found satisfactory is a molded crystal clear plastic known under the trademark LEXAN, which is a thermoplastic material which is extremely tough and also non-toxic. The specific bracket shown is the Begg type and is fabricated by TP Laboratories Inc. Alternatively, the bracket can be fabricated from any other material which will transmit ultraviolet light.

Thereafter, as shown in step 5, bracket 17 is placed in the desired position on tooth 18, and while it is held in position, an ultraviolet lamp gun 21 is caused to direct ultraviolet light at the bracket 17. The ultraviolet rays are transmitted through bracket 17 to polymerize the sealant in a few seconds and thus bond the bracket 17 to tooth 18. Polymerization can occur in a time span of between depending and 20 seconds depen on various factors such as the concentration of the adhesive and the intensity of the ultraviolet light. Because the cement does not harden until exposed to the ultraviolet light, bracket 17 can be manipulated into proper position without the necessity of hurrying, as would be required with rapidly setting cements. Furthermore because of the use of ultraviolet light to harden the cement, the complete polymerization of all portions of the cement is assured, thereby providing good bonding. The ultraviolet light is not harmful to the teeth or the oral tissues. Thereafter, pit and fissure sealant 16 is painted around the entire edge of base 20 by brush 19' and then exposed to ultraviolet light to provide a seal 30 with the tooth to protect the remainder of the cement on base 20 from erosion. Brackets 17 are then bonded to each of the remaining teeth in the same manner as described above. Thereafter, the arch wires 22 are placed in position relative to brackets 17.

It will be appreciated that the pit and fissure sealant has only been used in the past to seal pits and fissures in teeth but has never been used previously as an adhesive or cement to bond a member through which ultraviolet light can be transmitted to a surface. The major ingredients of the pit and fissure sealant can be a liquid three parts by weight of the reaction product of bisphenol A and glycidyl methacrylate and one part by weight of methyl methacrylate monomer. Just before the cement is used 2 percent by weight of benzoin methyl ether is dissolved in the above described liquid to form an ultraviolet sensitive composition. The above-described polymerization is carried out by a high intensity source of ultraviolet light supplying 8400 microwatts per square centimeter of radiation in the region of 3600 Angstroms at a distance of 6 to 8 inches. A pit and fissure sealant which has been used successfully in practicing the present method is commercially available under the trademark NUVA-SEAL and is manufactured by the Caulk Division of Dentsply International, Inc. The ultraviolet activator light 21 which has been used successfully is commercially obtainable under the trademark NUVA-LITE, and is manufactured by the above-mentioned company.

In FIG. 2 a tooth 23 is shown having a bracket such as 17 attached to the facial surface and another bracket 24 bonded to the lingual surface. This is accomplished very simply in accordance with the method of the present invention because the activator light 21 can be directed behind the tooth so as to bond bracket 24 rapidly while it is being held in position, especially considering that the bonding procedure takes only a few seconds.

In FIG. 3 a different type of bracket 25 is shown which can be used in conjunction with the method of the present invention. The base 26 of bracket 25 is made of a material which will transmit ultraviolet light and the protruding portions 27 may be either of metal or of plastic which is molded integrally with base 26. However, with metal portions the brackets may not blend with the teeth in their entirety.

The rear of the brackets may be conditioned prior to the application of the sealant by either roughing them up by a suitable abrading technique such as grinding, or by etching.

It will readily be appreciated that the use of a cement which is hardenable by ultraviolet light produces an extremely short setting time, thereby expediting the bracket installation procedure. Furthermore the use of the pit and fissure sealant as a cement obviates the necessity to trim excess cement from the teeth, because the cement is colorless or transparent and therefore will not contrast in color with any tooth to which it is applied. In addition, whenever transparent cement and transport brackets are used, the installation is aesthetically pleasing because the brackets and cement are relatively invisible because they in essence blend with any teeth to which they are applied. It will be appreciated that the brackets need not necessarily be entirely transparent to be aesthetically pleasing, but may include portions of any color which blend with or match the teeth, or they may be entirely of a tint which blends with or matches the teeth provided that they can transmit ultraviolet light when so tinted in their entirety.

It can thus be seen that the improved method of the present invention is manifestly capable of achieving the above enumerated objects and while a preferred embodiment has been disclosed, it will be appreciated that it can otherwise be embodied within the scope of the following claims.

What is claimed is:

1. A method of attaching a bracket to a tooth comprising the steps of providing a bracket through which ultraviolet light can be transmitted, applying a cement which hardens when exposed to ultraviolet light to an area where said bracket is to be secured to said tooth, placing said bracket in position on said tooth, and directing ultraviolet light at said cement through said bracket to harden said cement to thereby bond said bracket to said tooth.

2. A method of attaching a bracket to a tooth as set forth in claim 1 including the step of preparing the surface of said tooth to receive said adhesive.

3. A method of attaching a bracket to a tooth as set forth in claim 1 wherein said bracket is transparent.

4. A method of attaching a bracket to a tooth as set forth in claim 3 wherein said cement is placed on both said tooth and the rear of said bracket.

5. A method of attaching a bracket to a tooth as set forth in claim 3 wherein said cement is substantially transparent.

6. A method of attaching a bracket to a tooth as set forth in claim 5 including the step of applying said cement to the edge of said bracket and the adjacent portion of said tooth, and exposing said cement so applied to ultraviolet light to harden said cement to provide a seal between said edge of said bracket and said tooth.

* * * * *